(12) United States Patent
Maeki et al.

(10) Patent No.: US 11,255,990 B2
(45) Date of Patent: Feb. 22, 2022

(54) INTERNAL STRUCTURE DETECTION SYSTEM

(71) Applicant: HITACHI, LTD., Tokyo (JP)

(72) Inventors: Akira Maeki, Tokyo (JP); Shiro Mazawa, Tokyo (JP); Tatsuyuki Saito, Tokyo (JP); Takao Sakurai, Tokyo (JP); Tomonori Sekiguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/646,197

(22) PCT Filed: Oct. 25, 2017

(86) PCT No.: PCT/JP2017/038452
§ 371 (c)(1),
(2) Date: Mar. 11, 2020

(87) PCT Pub. No.: WO2019/082292
PCT Pub. Date: May 2, 2019

(65) Prior Publication Data
US 2020/0278463 A1  Sep. 3, 2020

(51) Int. Cl.
*G01V 1/16* (2006.01)
*G01V 1/18* (2006.01)
(52) U.S. Cl.
CPC .............. *G01V 1/168* (2013.01); *G01V 1/182* (2013.01); *G01V 2210/144* (2013.01)
(58) Field of Classification Search
CPC .. G01V 1/168; G01V 1/182; G01V 2210/144; G01V 11/005; G01V 1/20; G01V 1/003

USPC ............................................................ 367/7
See application file for complete search history.

(56) References Cited

U.S. PATENT DOCUMENTS

| | | | |
|---|---|---|---|
| 9,229,123 B2* | 1/2016 | Pan | G01V 1/36 |
| 9,575,196 B2* | 2/2017 | Ji | G01V 1/364 |
| 2013/0021875 A1 | 1/2013 | Eick et al. | |
| 2015/0346365 A1 | 12/2015 | Desrues | |
| 2016/0091524 A1 | 3/2016 | Kamada et al. | |
| 2018/0246239 A1 | 8/2018 | Maeki et al. | |

FOREIGN PATENT DOCUMENTS

| | | |
|---|---|---|
| JP | 2016-085085 A | 5/2016 |
| WO | 2017/141304 A1 | 8/2017 |

OTHER PUBLICATIONS

Translation of desorption of et al. (JP 2016085085). 47 pages. (Year: 2016).*
Translation of desorption of Maeki et al. (WO 2017/141304), 37 pages. (Year: 2017).*

(Continued)

*Primary Examiner* — Daniel L Murphy
(74) *Attorney, Agent, or Firm* — Mattingly & Malur, PC

(57) ABSTRACT

An internal structure detection system includes: two kinds of sensors with different operating principles for receiving reflected waves of vibration applied to an inspection target in an investigation area; and a processing apparatus that detects an internal structure of the inspection target by using the sensor data received by the two kinds of sensors. The two kinds of sensors are deployed in the investigation area with different densities, in a distributed manner.

11 Claims, 10 Drawing Sheets

(56) References Cited

OTHER PUBLICATIONS

Fumitoshi Murakami, et al. Evaluation of MEMS Accelerometer Sensor for Earthquake Observations, Bulletin of the Earthquake Research Institute, University of Tokyo, vol. 84, 2009, pp. 251-266 abstract only in English.
International Search Report and Written Opinion of PCT/JP2017/038452 dated Jan. 9, 2018.

* cited by examiner

| SENSOR ID | MODEL | INSPECTION DATE AND TIME 1 | INSPECTION RESULT 1 | INSPECTION DATE AND TIME 2 | INSPECTION RESULT 2 | ... |
|---|---|---|---|---|---|---|
| G000001 | | | OK | | OK | ... |
| G000002 | | | OK | | OK | ... |
| ... | ... | ... | ... | ... | ... | ... |
| M000001 | | | OK | | OK | ... |
| M000002 | | | OK | | CHARACTERISTIC ALTERATION | ... |
| ... | ... | ... | ... | ... | ... | ... |

| SENSOR ID | FREQUENCY CHARACTERISTICS | | | | | |
|---|---|---|---|---|---|---|
| G000001 | 1Hz | 2Hz | 3Hz | ... | 10Hz | 20Hz |
| NOISE DENSITY | | | | ... | | |
| VALIDITY COEFFICIENT | 0 | 0 | 0 | ... | 1 | 1 |

| SENSOR ID | FREQUENCY CHARACTERISTICS | | | | | |
|---|---|---|---|---|---|---|
| M000001 | 1Hz | 2Hz | 3Hz | ... | 10Hz | 20Hz |
| NOISE DENSITY | | | | ... | | |
| VALIDITY COEFFICIENT | 1 | 1 | 1 | ... | 1 | 1 |

| SENSOR ID | FREQUENCY CHARACTERISTICS | | | | | |
|---|---|---|---|---|---|---|
| M000002 | 1Hz | 2Hz | 3Hz | ... | 10Hz | 20Hz |
| NOISE DENSITY | | | | ... | | |
| VALIDITY COEFFICIENT | 0 | 0 | 1 | ... | 1 | 1 |

INTERNAL STRUCTURE DETECTION SYSTEM

TECHNICAL FIELD

The present invention relates to a system that detects an internal structure.

BACKGROUND ART

As a method of detecting an internal structure of a construction, capturing an elastic wave using a speed sensor or an acceleration sensor and analyzing data of the captured elastic wave and thereby detecting the internal structure of the construction is widely practiced. Such a method is applied not only to later-described resource exploration but also to non-destructive testing by ultrasound probe, inspection of bridges, buildings, tunnels or the like, and water leakage inspection of water pipes. Hereinafter, a resource exploration is described as an example of such application. In petroleum and gas industries, large-size reservoirs (petroleum and gas reservoirs), which are easy to extract petroleum and/or gas, have already been discovered and developed. Henceforth, exploration at a deeper depth and in a complex stratum is required. Improvement in sensitivity of sensors and/or high-density exploration is important to achieve such exploration. In addition, a lower cost of operation is demanded from the market.

A method referred to as physical exploration or reflection seismic exploration is present as a method widely used in resource exploration. In principle, elastic waves generated by an artificial seismic source (such as a dynamite, a vibrator vehicle that vibrates the ground, and the like) are reflected at an interface of a stratum, for example, an interface of a petroleum layer, gas layer, water, a rock layer, etc.; reflected waves returning to the ground surface are detected by a plurality of sensors deployed on the ground surface or a borehole; and an underground structure image is constructed from data of these reflected waves.

Geophones, which are speed sensors utilizing a coil and a magnet, are widely used as sensors for detecting reflected waves. However, in the case of geophones, it is practically difficult to improve the sensitivity in a low frequency region in the range of several hertz and to obtain flat frequency characteristics. Thus, there is a demand for another sensor mechanism that resolve these problems. In this context, a high sensitive sensor using a micro electromechanical system (MEMS) technology, which utilizes conventional semiconductor circuits and mechanical operations, is disclosed for example in Patent Literature 1 "INERTIAL SENSOR".

PRIOR ART DOCUMENT

Patent Literature

Patent Literature 1: United State Patent Application Publication No. 2016/0091524

SUMMARY OF THE INVENTION

Technical Problem

The use of the technique disclosed in Patent Literature 1 or the like makes it possible to construct a MEMS sensor which is highly sensitive in the low-frequency region and superior in the frequency characteristics. However, MEMS sensors have a shorter history for use in resource explorations and more complex structures than the geophones and thus differ from the geophones in terms of variations in products, long-term reliability, and price.

In addition, it is presumed that during an introduction period of a new sensor, e.g., MEMS sensor, exploration operations using both the geophones owned by an exploration service company and the MEMS sensors would be carried out, in which case the performance difference between sensors with different types will be large.

Exploration data collected by sensors is rendered as an underground image of the exploration area by an analysis algorithm implemented in a computer, which underground image is used for petroleum/gas reservoir estimation. It has been known that computation using high accurate and highly reliable data contributes to improvement of the quality and precision of the estimation. For example, for an analysis method called full waveform inversion (FWI), which has been paid attention and put into practice in recent years, it is known that the quality and precision of the exploration data in a low frequency region is more important.

The geophones, having used so far, have a simple structure and have not so large variations in products and would not be so much degraded, and, moreover, take the same form of a speed sensor made up of a coil and a magnet. Accordingly, in the case of resource exploration using geophones, the resource explorations have been conducted by performing: without serious consideration of variations in products of geophones, deployment of the geophones to the field (arranging sensors to predetermined positions), exploration operations (causing the ground to vibrate by a vibrator vehicle, capturing a reflected wave reflected from a reflection surface in the underground by the sensors and extending the exploration area while rearranging the deployed sensors, and the like), and analysis and interpretation (estimating the underground structure on the basis of the data acquired by the sensors and stratum samples).

However, upon introduction of MEMS sensors, consideration needs to be made of the fact that, as described above, the sensitivity characteristics would greatly vary due to the sensor type and variations in products; and consideration needs to be made of how a correct analysis result can be obtained with evolution of analysis technique represented by FWI, under the given condition of the variations in sensor sensitivity.

Furthermore, in the case of FWI, due to its calculation process, the quality of data in a low frequency region has significant effect to the final output. Therefore, it is important to extract more highly reliable and more highly accurate data from the obtained data.

The present invention resolves the above-described problems, and it is an object of the present invention to provide an internal structure detection system capable of acquiring highly reliable and highly accurate data about an investigation area.

Solutions to Problem

To achieve the above-described object, an internal structure detection system of the present invention includes: two kinds of sensors with different operating principles (e.g., geophone sensor terminals 302, MEMS sensor terminals 310) for receiving reflected waves of vibration applied to an inspection target in an investigation area; and a processing apparatus (e.g., processing apparatus 120) that detects an internal structure of the inspection target by using the sensor data received by the two kinds of sensors. The two kinds of sensors are deployed in the investigation area with different densities, in a distributed manner. Other aspects of the present invention are described with an embodiment described later.

Advantageous Effects of the Invention

The present invention makes it possible to acquire highly reliable and highly accurate data in an investigation area.

BRIEF DESCRIPTION OF DRAWINGS

FIG. 12 is a diagram illustrating sensor inspection information.

FIG. 13 is a diagram illustrating an example of the sensor characteristics information of a geophone sensor.

FIG. 14 is a diagram illustrating an example of the sensor characteristics information of a MEMS sensor.

FIG. 15 is a diagram illustrating an example of the sensor characteristics information of another MEMS sensor.

DESCRIPTION OF EMBODIMENTS

An embodiment for carrying out the present invention is described in detail with reference to the drawings as appropriate.

Figure 1:
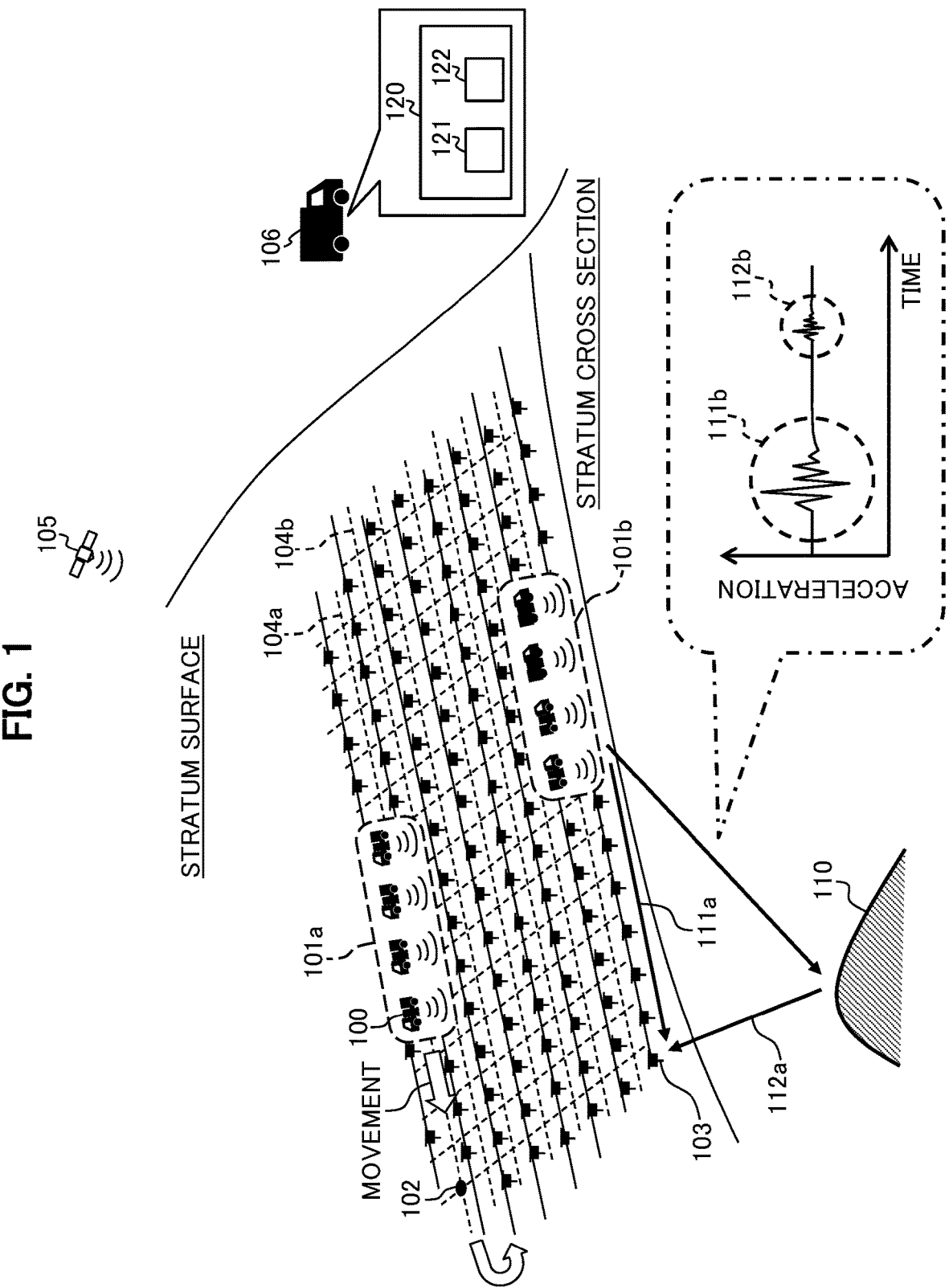
FIG. 1 is a diagram illustrating an example of resource exploration according to an internal structure detection system of a present embodiment.

FIG. 1 is a diagram illustrating an example of resource exploration according to an internal structure detection system of a present embodiment. FIG. 1 illustrates a simplified configuration to describe points of the invention. However, sensors and/or shot points may not necessarily be arranged in an orderly manner as shown in the figure, due to various factors in the actual field.

One or a plurality of vibrator vehicles 100 constitute one group of vibrator vehicles 101a and move to a shot point 102 and generate seismic waves. For example, the group of vibrator vehicles 101a may be constituted by four vibrator vehicles 100. In FIG. 1, only one shot point 102 is illustrated as the shot point. However, all the intersections of the lattice illustrated in FIG. 1 are each a shot point. Accordingly, the group of vibrator vehicles 101a generates seismic waves at the shot points corresponding to the intersections of the lattice, while moving substantially straight on a movement path 104a.

Upon having moved to the shot points 102 and generated seismic waves, the group of vibrator vehicles 101a makes a U-turn and generates seismic waves, while moving on a movement path 104b. In this way, the group of vibrator vehicles 101a generates seismic waves at shot points set in advance in the investigation area, e.g., at all the intersection of the lattice illustrated in FIG. 1 by repeating a substantially straight movement and a U-turn. For example, the shot points are set at certain intervals determined in advance, for example at intervals of 50 m. The position of a shot point is located using a global positioning system (GPS) signal from a satellite 105, for example.

For example, 100 thousand shot points are specified in a manner that depends on a region of the investigation area (exploration area), etc. As the number of the shot points is large, the exploration is performed in the same period of time by dividing the exploration area into a plurality of regions assigned to a plurality of groups of vibrator vehicles 101 including the group of vibrator vehicles 101a (referred to as group of vibrator vehicles 101 when the group of vibrator vehicles 101a is not specifically referred to and the group of vibrator vehicles in FIG. 1 is generally referred to; and other reference symbols are referred to in the same manner), shifting the timing for generating seismic waves to avoid adverse effects, and/or embedding code in the waveform of the generated seismic waves.

It should be noted that although the group of vibrator vehicles 101 is represented by one row in FIG. 1, it may be organized in a plurality of rows, e.g., in two rows. In some cases, depending on the exploration area and/or the density of the shot points, a group of four vibrator vehicles 101 in two rows each with two vibrator vehicles 101 can be preferred compared to a group of four vibrator vehicles 101 in one row. FIG. 1 shows a group of four vibrator vehicles 100 as an example of the group of vibrator vehicles 101. However, the group of vibrator vehicles 101 may consist of one vibrator vehicle 100. Vibration energies of the group of vibrator vehicles 101 are measured and recorded in advance irrespective of the configuration of the group of vibrator vehicles 101. The group of vibrator vehicles 101a repeats generation of seismic waves and movement to move to the location of the group of vibrator vehicles 101b.

The vibration caused by the seismic wave generation of the group of vibrator vehicles 101b is reflected, for example, by a boundary surface between a stratum such as a rock layer and a reservoir 110 containing petroleum and/or gas and becomes a reflected wave 112a. The reflected wave 112a can be detected by a sensor terminal 103, for example. Signals of the reflected wave 112a or the like detected by the sensor terminal 103 are collected by an observation vehicle 106, etc., and then analyzed by a processing apparatus 120. Also, a surface wave 111a, which though is vibration not necessary for exploration, travels from the group of vibrator vehicles 101b to the sensor terminal 103 on a ground surface. Use of the surface wave 111a will be described later.

The sensor terminal 103 detects vibrations of the surface wave 111a and the reflected wave 112a as acceleration. In general, the distance from the group of vibrator vehicles 101b to the sensor terminal 103 is shorter than the distance from the group of vibrator vehicles 101b to the sensor terminal 103 via a reservoir 110. Therefore, after the time of generating seismic waves, the acceleration 111b resulting from the vibration of the surface wave 111a is detected earlier than when the acceleration 112b resulting from the vibration of the reflected wave 112a is detected, and the detected value of the acceleration 111b is greater than that of the acceleration 112b.

As illustrated in FIG. 1, a plurality of sensor terminals 103 is arranged. Similarly to the shot points, for example, 100 thousand sensor terminals 103 are arranged in a manner that depends on the regions or the like of the exploration area. Normally, the sensor terminals 103 are arranged in areas overlapping with the movement path 104 of the group of vibrator vehicles 101. However, the sensor terminals 103 may be arranged in areas not overlapping with the movement path 104 of the group of vibrator vehicles 101. The exploration area may be a desert or an urban area or the like.

The sensor terminals 103 are deployed before the group of vibrator vehicles 101 starts the first generation of seismic waves and are collected after the group of vibrator vehicles 101 finishes the last generation of seismic waves. Alternatively, the exploration may be performed, while rearranging the sensor terminals 103 in order to extend the exploration area, by the group of vibrator vehicles 101 generating vibrations and the sensor terminals 103 performing measurement. For this reason, there is a possibility that the sensor terminals 103 be deployed in a harsh environment for a long time.

Figure 2:
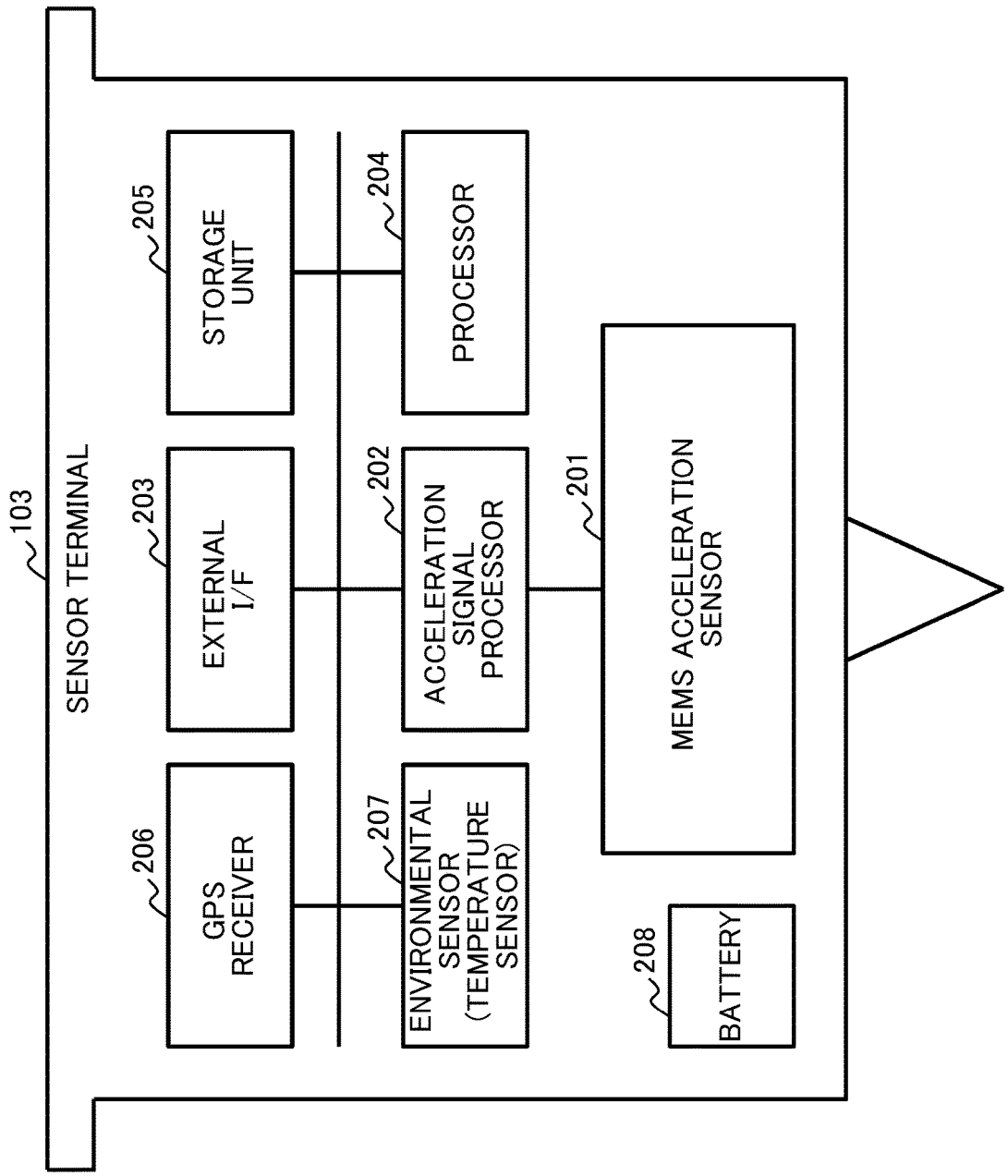
FIG. 2 is a diagram illustrating an example of a sensor terminal.

FIG. 2 is a diagram illustrating an example of the sensor terminal 103. Here, description will be given of a case in which a MEMS acceleration sensor 201 is used in the sensor terminal 103. A MEMS acceleration sensor 201 is an acceleration sensor using MEMS technology. The MEMS acceleration sensor 201 detects vibration applied to the sensor terminal 103 such the surface wave 111a, the reflected wave 112a, or the like as acceleration and converts the detected acceleration into an electrical signal. The MEMS acceleration sensor 201 has high sensitivity. On the other hand, however, as a microstructure is adopted and a hard material mechanically vibrates, the MEMS acceleration sensor 201 may be subject to deterioration or damage due to an influence from the outside, not only by a strong impact but also by rapid thermal cycle and/or operations at high or low temperature. There exist a telemetry system and a nodal system. The telemetry system is a system in which sensor terminals are connected with cables to collect information in a real-time manner, control the terminal, and supply power to the terminals. The nodal system is a cableless system in which the sensor terminals 103 themselves operate independently and hold the acceleration data or the like by themselves.

The MEMS acceleration sensor 201 has a movable part and a fixed part to which vibration from the outside is transmitted and which is connected via an elastic body to the movable part. The MEMS acceleration sensor 201 is configured to determine an acceleration on the basis of, for example, the variation in the capacity values of the fixed part and movable part that occurs due to the external vibration.

In general, due to these factors and problems related to the characteristics of the materials of the MEMS acceleration sensor 201 and to the package or the like thereof, the degree of vacuum in the space between the fixed part and the movable part may decrease for example, resulting in a change in the elastic characteristics of the elastic body. As a result of an increase in the detectable minimum vibration width, the minimum vibration width may increase to exceed a predetermined threshold value and leads to such a damage that no vibration can be detected. There have been several measures taken to address these problems.

It should be noted that although the MEMS acceleration sensor 201 is typically an electrostatic capacitance detection acceleration sensor, it is not limited thereto. The MEMS acceleration sensor 201 may be based on another configuration, in which case, however, externally imposed different factors need to be taken into account. The MEMS acceleration sensor 201 may be a sensor or a sensor chip alone. Besides, the MEMS acceleration sensor 201 may include a certain circuit. In addition, the MEMS acceleration sensor 201 may include a package for covering those parts. Moreover, the MEMS acceleration sensor 201 may be a speed sensor rather than an acceleration sensor.

The sensor terminal 103 includes the above-described MEMS acceleration sensor 201, an acceleration signal processor 202, an external interface (I/F) 203, a processor 204, a storage unit 205, a GPS receiver 206, an environmental sensor 207, and a battery 208. Alternatively, in the case of the above-described telemetry system, the sensor terminal 103 may be configured such that it depends on external devices with regard to the storage unit 205 and/or the battery 208.

The processor 204 controls each part of the sensor terminal 103 according to a program stored in advance. When operation parameter setting needs to be made in the acceleration signal processor 202, the external I/F 203, the GPS receiver 206, and the environmental sensor 207, the processor 204 sets the operation parameters according to a program.

The processor 204 may include one or a plurality of timers. The timer counts time from a preset time. The preset time may be a time at which the sensor terminal 103 including the processor 204 is manufactured, a time at which the MEMS acceleration sensor 201 is manufactured, or a specific standard time. The counting continues without stopping during the period for counting. The period for counting may be power supply periods and the counting may be started and suspended on the basis of predetermined conditions. The counted periods may be used for the management of the regular inspection of the sensor.

The processor 204 may be a so-called microprocessor (single-chip microcomputer). The processor 204 may include a storage unit, and a program or data stored in the storage unit 205 may be stored in the storage unit included in the processor 204.

The acceleration signal processor 202 amplifies the electrical signal which has been converted from the acceleration by the MEMS acceleration sensor 201, converts the amplified analog electric signal into an acceleration value of a digital electrical signal, and corrects the digital electrical signal in accordance with a detection characteristics of the MEMS acceleration sensor 201. The acceleration signal processor 202 includes a feedback circuit for the purpose of the amplification and correction. The feedback circuit may be configured to perform a feedback operation according to an amplification ratio parameter and a correction ratio. The acceleration signal processor 202 may be an application specific integrated circuit (ASIC).

The external interface (I/F) 203 is an interface communicating with the outside of the sensor terminal 103. The external I/F 203 may be a wireless communication interface, a wired communication interface, or an interface performing wireless communication and wired communication.

The external I/F 203 transmits the acceleration value which has been subjected to the conversion performed by the acceleration signal processor 202. Here, in accordance with instructions from the processor 204, the acceleration value may be temporarily stored in the storage unit 205 for the sake of data protection, and then an acceleration value read out of the storage unit 205 may be transmitted. The external I/F 203 transmits a value detected by the environmental sensor 207. The external I/F 203 transmits information input from the processor 204 and outputs received information to the processor 204. The above-described is a case of telemetry system. In a case of nodal system, the obtained data is stored in the storage unit 205 during the deployment period, then after the collection of the sensor terminal 103 is finished, the data is stored in an external storage via the external I/F 203. FIG. 2 illustrates a case in which the environmental sensor 207 is included in the sensor terminal 103. However, the sensor terminal 103 may be configured to obtain equivalent data through another implementation configuration.

The storage unit 205 stores a program for the processor 204, and stores data necessary for the processor 204 to execute the program. The storage unit 205 stores values outputted by the acceleration signal processor 202, the GPS receiver 206, and the environmental sensor. Further, the storage unit 205 stores a sensor ID (sensor identification information) as information identifying the MEMS acceleration sensor 201. Further, the storage unit 205 stores the later-described noise spectral density (see FIG. 5) (sensor characteristics information) of the MEMS acceleration sensor 201 in the form of a formula, a table, or a model, in association with the sensor ID.

The processing apparatus 120 (see FIG. 1) includes a processing unit 121 and a storage unit 122. The processing apparatus 120 retrieves sensor characteristics information from sensor terminals 103 under possession before performing exploration on the exploration area, which is the investigation area. The sensor characteristics information is stored in the storage unit 122. Alternatively, the sensor characteristics information can be stored on a proprietary database and/or cloud system of a company, such as the manufacturer of the MEMS acceleration sensor 201 and/or the sensor terminals 103, an owner company of the sensor terminals 103, an analysis company, or a petroleum company, in association with the sensor IDs. A description will be given of an example of database in the processing apparatus 120 with reference to FIGS. 12 to 15.

FIG. 12 illustrates sensor inspection information. The storage unit 122 of the processing apparatus 120 stores sensor inspection information 122A in possession. The sensor inspection information 122A includes sensor ID, model type, inspection date 1, inspection result 1, inspection date 2, inspection result 2, and the like. The sensor is inspected at predetermined intervals with regard to sensor characteristics. The inspection date and the inspection result of each inspection is recorded.

As described above, the sensor ID is a unique identifier assigned to the speed sensor or acceleration sensor, which detects vibration. A sensor ID starting with "G" represents a geophone sensor; and a sensor ID starting with "M" represents to MEMS sensor. At least the measurement frequency bands of the two kinds of sensors (geophone sensor and MEMS sensor) are overlapped.

As to the inspection results, in the case of sensor ID with "G000001", the inspection result 1 and inspection result 2 are both "OK" (no alteration found in sensor characteristics); whereas in the case of sensor ID with "M000002", the inspection result 1 is "OK" but inspection result 2 is "CHARACTERISTIC ALTERATION", which indicates that alteration of the sensor characteristics was found. Sensor characteristics information of each sensor will be described with reference to FIGS. 13, 14, and 15.

FIG. 13 is a diagram illustrating an example of the sensor characteristics information of a geophone sensor. The sensor characteristics information 122B includes a sensor ID, noise densities at frequencies, validity coefficients at frequencies and the like. The noise densities at frequencies are obtained by quantifying the noise spectral density shown in FIG. 5 described later. A value of "1" of validity coefficient at a frequency means that data at that frequency is to be used and a value "0" means that the data at that frequency is not to be used.

As shown in FIG. 13, in the case in which the sensor ID is "G000001", as the noise densities at lower frequencies are high, the validity coefficients at 1 Hz, 2 Hz, 3 Hz, . . . are each specified as "0". The processing unit 121 of the processing apparatus 120 sets the validity coefficient at a frequency to "0" when the noise density at that frequency is greater than or equal to a predetermined threshold value. Alternatively, the validity coefficients may be specified by a manager on the basis of a preliminary investigation on the investigation area.

FIG. 14 is a diagram illustrating an example of the sensor characteristics information of a MEMS sensor. The sensor characteristics information 122C includes, like the sensor characteristics information 122B, a sensor ID, noise densities at frequencies, validity coefficients at frequencies and the like. As shown in FIG. 14, in the case in which the sensor ID is "M000001", as the noise densities at lower frequencies are low, for example, the validity coefficients at 1 Hz, 2 Hz, 3 Hz, . . . are each specified as "1".

FIG. 15 is a diagram illustrating another example of the sensor characteristics information of a MEMS sensor. The sensor characteristics information 122D includes, like the sensor characteristics information 122B, a sensor ID, noise densities at frequencies, validity coefficients at frequencies and the like. As shown in FIG. 15, in the case in which the sensor ID is "M000002", as the inspection result 2 shown in FIG. 12 indicates "CHARACTERISTIC ALTERATION" and the noise densities at lower frequencies near 1 Hz and 2 Hz has become high, the validity coefficients at 1 Hz and 2 Hz are each specified as "0".

Returning to FIG. 2, when the sensor terminal 103 includes a plurality of MEMS acceleration sensor 201, the sensor terminal 103 has a plurality of sensor IDs, in which case a piece of sensor characteristics information is stored in association with each sensor ID. Each sensor ID identifies a MEMS acceleration sensor 201. When the sensor terminal 103 includes a plurality of MEMS acceleration sensor 201, the ID of each MEMS acceleration sensor 201 may be a combination of an ID identifying the sensor terminal 103 and an ID identifying the MEMS acceleration sensor 201.

The GPS receiver 206 receives a GPS signal and outputs location information of the sensor terminal 103. The processor 204 stores the location information outputted by the GPS receiver 206 together with a value outputted by the acceleration signal processor 202 and/or a value outputted by the environmental sensor 207 in the storage unit 205 and transmits them using the external I/F 203. When the location of the sensor terminal 103 is determined by another device when the sensor terminal 103 is deployed, the GPS receiver 206 may not be present. In addition, the GPS receiver 206 may receive the GPS signal and perform time synchronization.

The environmental sensor 207 includes a temperature sensor that detects, for example, a temperature of the MEMS acceleration sensor 201 or an external temperature of the sensor terminal 103. The environmental sensor 207 may include a humidity sensor and include an acceleration sensor separately from the MEMS acceleration sensor 201. The separate acceleration sensor may be an acceleration sensor manufactured in the same time period as, or in a time period different from, that of the MEMS acceleration sensor 201; may be an acceleration sensor manufactured in the same manufacturing lot as, or in a manufacturing lot different from, that of the MEMS acceleration sensor 201; or may be an acceleration sensor having a structure different from that of the MEMS acceleration sensor 201.

The processor 204 compares the value outputted by the acceleration signal processor 202 or the environmental sensor 207 with a preset threshold value. When processor 204 determines that the output value has exceeded the threshold value, the processor 204 may store the values outputted from the acceleration signal processor 202, the environmental sensor 207, and the GPS receiver 206, together with a count value of the timer in the storage unit 205, and may transmit the values from the external I/F 203.

In addition, when the count of the timer has reached a value of a preset interval, the processor 204 may store the values outputted from these components together with the count value of the timer in the storage unit 205 and transmit the values from the external I/F 203. The battery 208 supplies power to each circuit in the sensor terminal.

Although not illustrated, the geophones primarily used currently are each a speed sensor made up of a magnet and a coil. By fixing the magnet and/or the coil to a housing of the sensor terminal, movement of the ground generates a relative movement between the magnetic field and the coil, causing an electromotive force proportional to the velocity of the relative movement to be generated in the coil. On the basis of the value of the electromotive force, the movement of the ground is observed.

Specifically, the geophone is made up of a coil fixed to a pendulum suspended via a spring and a permanent magnet fixed to a casing of a vibration receiver, which gets vibrated in the same vibration as that of the ground surface. When the casing of the vibration receiver gets vibrated according to the ground vibration, a relative movement according to the ground vibration occurs between the magnet and the pendulum, causing an electromotive force in the coil. The electromotive force is proportional to the velocity of the relative movement.

Parameters defining the specification of the geophone include an eigenfrequency, damping (attenuation constant), sensitivity. Geophones with an eigenfrequency of 10 Hz to 15 Hz or the like are often used in resource explorations. A value of about 0.7 is used as the attenuation constant so that a flat amplitude spectrum can be obtained. As the geophones take the simple structure as described above, the number of elements prone to deterioration and/or breakage is small compared to MEMS sensors and therefore diagnosis and repair of the geophones are relatively easy.

Figure 3:
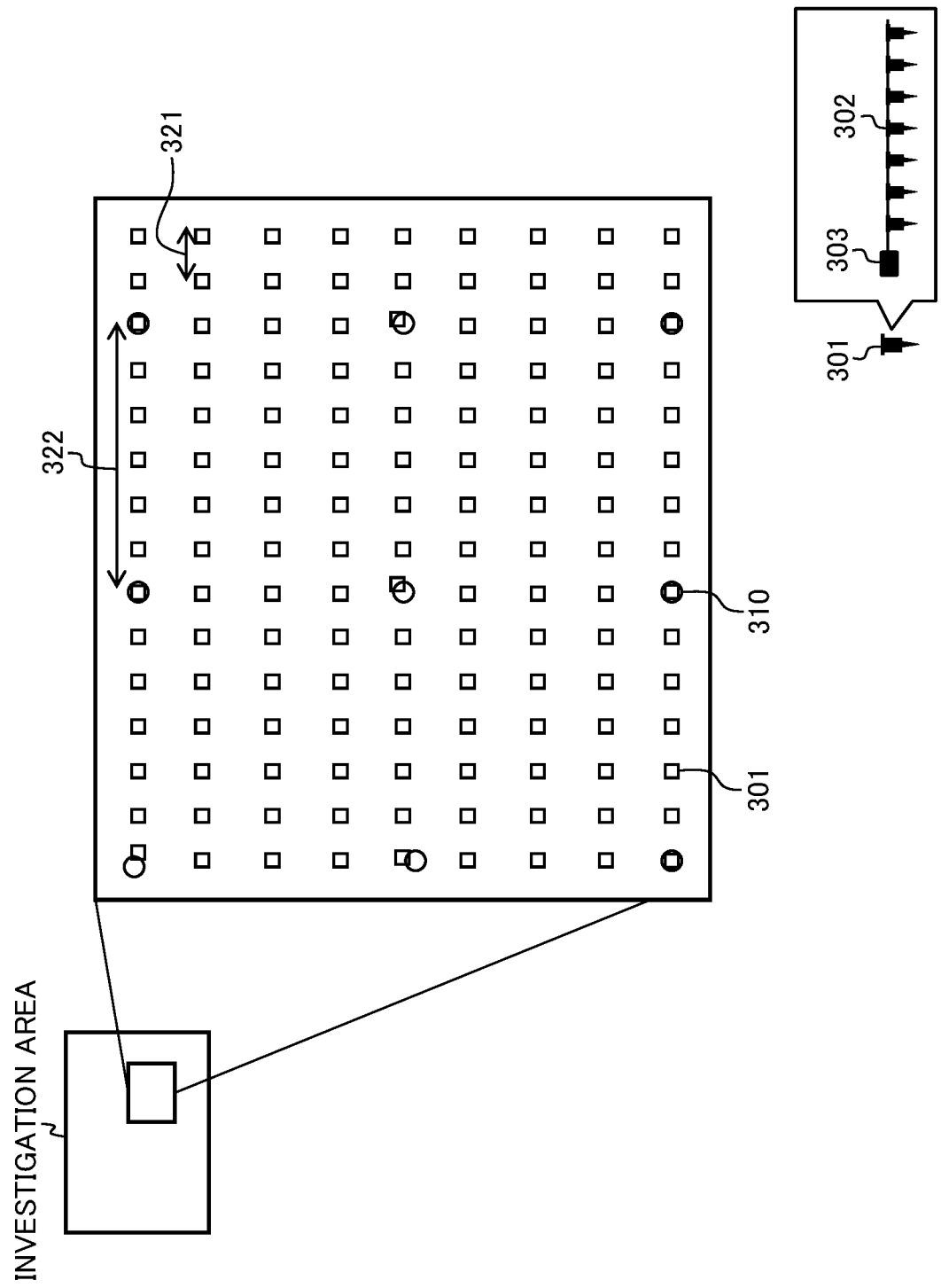
FIG. 3 is a diagram illustrating a layout example in which a plurality of types of sensor terminals are deployed.

FIG. 3 is a diagram illustrating a layout example in which a plurality of types of sensor terminals are arranged. A description will be given with reference to FIG. 1 as well as appropriate. In response to a request for exploration with an exploration area and a time period specified by a petroleum company or client, an exploration service company will design an exploration plan suitable to the sensors and the vibrator vehicles owned by the company. The exploration plan specifies when and in what layout the sensors are to be deployed and the locations of the shot points at which seismic waves are to be generated. In such an occasion, it is widely practiced that when the number of sensors is not enough in a large-scale exploration, the sensors are rearranged to cover the predetermined exploration area. The figure illustrates an example in which sensor terminals are constituted by a geophone array 301 and MEMS sensor terminals 310.

The geophone array 301 is constituted by a plurality of geophone sensor terminals 302 and an analog-to-digital convertor (ADC) 303, which converts analog vibration data to a digital signal, and the like. The use of the array makes it possible to improve the SN-ratio of the reflected wave and restrain the surface wave (elastic wave directly propagated from the vibrator vehicle along the ground surface: 111*a* in FIG. 1) that becomes a noise component. The present embodiment presents an example using the geophone array 301. However, alternatively, a large number of geophone sensor terminals 302 each of which is equipped with an ADC may be deployed.

In FIG. 3, illustration of the cables (providing data and power and the like) connecting the sensors is omitted.

The use of geophones taking a form of being connected with cables is a mainstream approach. This form is called telemetry system and allows the observation vehicle 106 to observe the status of the sensors and the data of the generated seismic waves. Alternatively, in a form called nodal system, each of the sensors includes a battery and a data storage unit and stores data during the exploration period, and the data is retrieved from a rack or the like in the event of collection of the sensor terminals.

The nodal form is taken in cases in which cable connection is difficult due to a site location such as when a river is present or in cases when handling of cables is complicated due to a huge number of cables.

The system according of the present embodiment has: two kinds of sensors (geophone sensor terminals 302 and MEMS sensor terminals 310) with different operating principles for receiving reflected waves of the vibration applied to an inspection target in the investigation area; and a processing apparatus 120 that detects the internal structure of the inspection target by using the sensor data received by the two kinds of sensors. The two kinds of sensors are deployed in the investigation area with different densities, in a distributed manner.

FIG. 3 illustrates an inter-geophone sensor distance 321 of the plurality of geophone sensor terminals 302 included in the geophone array and an inter-MEMS sensor distance 322. FIG. 3 shows that the plurality of geophone sensor terminals 302 and the MEMS sensors are deployed such that the following formula is hold.

$$\text{inter-MEMS sensor distance 322} > \text{inter-geophone sensor distance 321} \quad (1)$$

Incidentally, FIG. 3 illustrates distances in the left-right direction in the drawing. The relation represented in formula (1) also holds for the distances in the up-down direction in the drawing.

The vibrator vehicle 100 outputs a sweep waveform in which the frequency of the wave continuously varies, by using an oil pressure mechanism. Signals from a reflection surface located underground is captured by a large number of receivers (sensors) and thereby the underground structure is estimated by computation. In this process, results of an analysis using low frequency signals are important information to estimate the underground structure. For this reason, improvement of low frequency characteristics of vibrator vehicles 100 and receivers (sensors) is being vigorously promoted.

In the lower frequency region, the spatial resolution gets low due to the wavelength of the frequency and therefore deployment of receivers (sensors) with a high density is not so worthwhile in estimating the stratum. Moreover, receivers (sensors) having low noise density in the low frequency region, i.e., high-sensitivity in the low frequency region, are recently available as MEMS sensor terminals 310 or as low-frequency geophones. However, they are expensive because of their introduction phase and low-frequency geophones are assumed to be large in size and are limited in the number of owned devices of each company.

Therefore, deploying sensors having high sensitivity in the lower frequency region in a distributed manner is a preferable embodiment in terms of reduction of exploration cost (reduction of exploration period) and reduction of facility cost (MEMS sensor purchase cost).

As the process of full wave inversion (FWI) gradually increases the analysis frequency from a low frequency band to estimate the underground structure, it is preferable that reliable information be input to the computer for the low frequency band processed at the beginning of the process. Therefore, by giving a validity coefficient (reliability) to the data according to the sensitivity of the sensor in each calculation frequency band on the basis of the frequency characteristics of a sensor, it is expected that the accuracy of estimating the underground structure increase.

Figure 4:
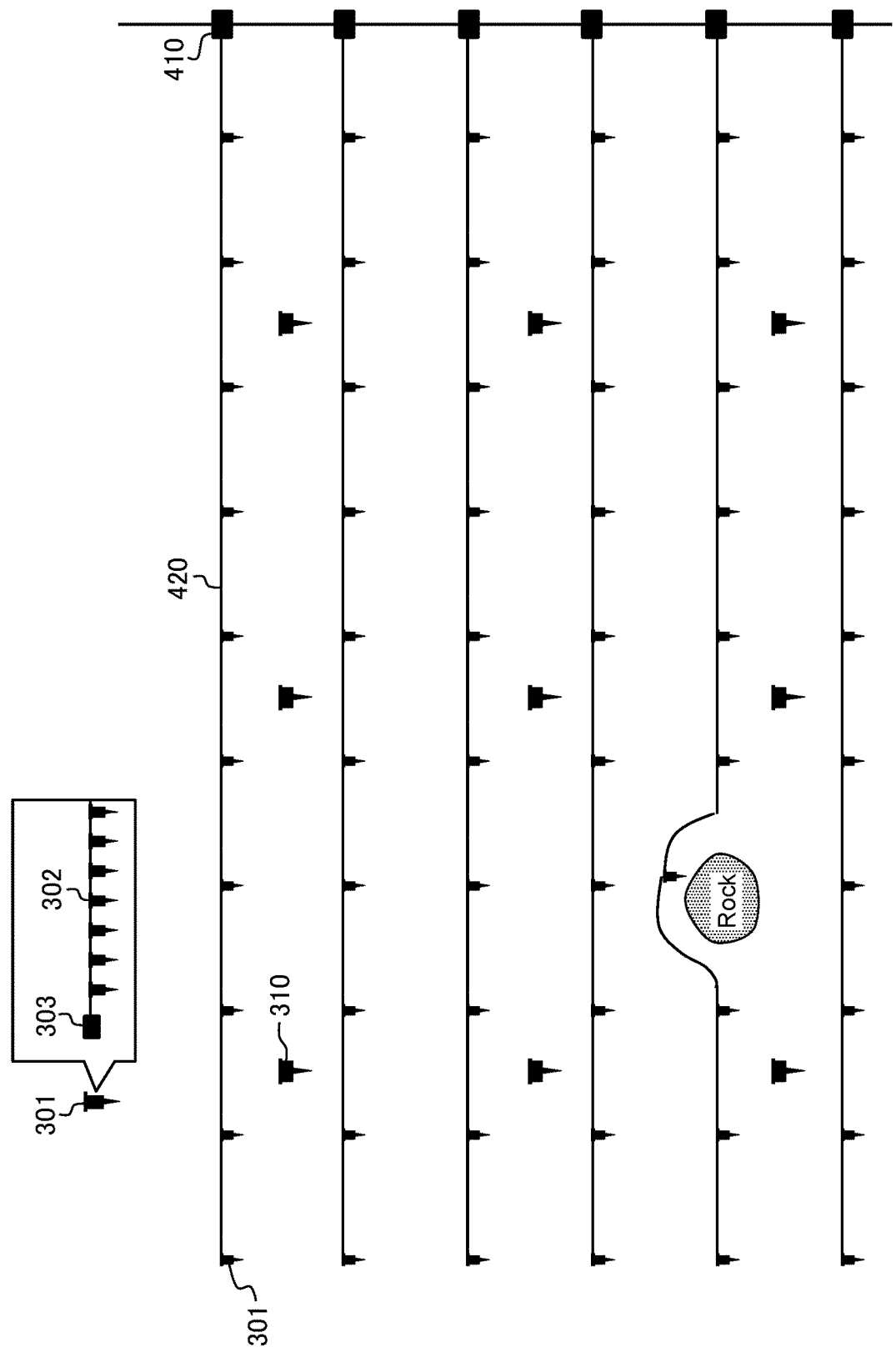
FIG. 4 is a diagram illustrating another layout example in which a plurality of types of sensor terminals are deployed.

FIG. 4 is a diagram illustrating another layout example in which a plurality of types of sensor terminals are deployed. FIG. 4 presents more details than as presented in FIG. 3. As shown in bottom left for example, when a rock or tree is present at a location at which a sensor is planned to be deployed, the sensor is arranged so as to avoid that location. The geophone array 301 is connected with a cable 420 for transmitting data and supplying power and the data is stored in data loggers 410, so that an observer can check the status of the sensors as appropriate and retrieve data (telemetry system).

On the other hand, each of the MEMS sensor terminals 310 shown in FIG. 4 is of a nodal type and stores data in a storage unit thereof after the MEMS sensor terminal 310 is deployed until the exploration and the collection of the MEMS sensor terminal 310 are finished. After the collection of the MEMS sensor terminals 310 is finished, their data is collected via cables or via wireless communication. It should be noted that, alternatively, the MEMS sensor terminals 310 may be of a telemetry type and cables may be used as their transmission lines.

When the number of MEMS sensor terminals 310 available in the exploration is limited, it is preferable that, for the purpose of the analysis, they be sparsely deployed as shown in the figure rather than deployed together in one place.

In a reflection seismic exploration, on a path passing through a shot point, a reflection point, and a vibration reception point, a Fresnel zone is created in a surface area on a reflection surface. In general, a structural variation smaller than this zone cannot be identified, and thus the size of the Fresnel zone can be regarded as a limit indicator of the horizontal resolution of the reflection seismic exploration. This Fresnel zone depends on the relative position between the shot point and the reception point, the propagation velocity, and the wavelength of the wave. Thus, when the elastic wave is a low-frequency wave, no matter how the interval between reception points, i.e., interval between sensors, is made narrow, it is not possible to obtain a spatial resolution corresponding to the interval.

Therefore, when deploying sensors, it is preferable that the plan for sensor deployment on the ground surface be created taking the Fresnel zone into account. In the above-described arrangement example, MEMS sensor terminals 310 having superior sensitivity (low-noise density) in the low frequency band are deployed such that the density of deployment is low. However, the deployment is not limited thereto. An essential point of the present invention is whether the density of deployment is low or high is determined on the basis of the noise spectral density.

Next, a description will be given of an example of analysis method for estimating underground structure on the basis of the data obtained from sensors. A time required for an earthquake wave to have traveled from the earthquake source to the observation point is called "travel time" of the earthquake wave. A method of estimating detailed earthquake wave velocity distribution in the underground by utilizing travel time data is called travel-time tomography. Here, ray tracing is used to calculate a theoretical travel time from an assumed velocity model. Then, an inverse problem is sequentially solved in such a way that the residual difference between the theoretical travel time and an actually observed travel time is minimized. As a result, the velocity model is corrected. There are methods of obtaining physical property distribution of an underground medium by inversion (estimation of a model that fits with observation data, also called inverse problem) using all the information including not only the travel time information but also phases and amplitudes and the like of recorded waves including succeeding waves. One of such methods is the analysis method called full wave inversion (FWI) mentioned above.

That analysis method is capable of estimating physical property distribution (velocity, density, attenuation and the like) more accurately with higher resolution than travel-time tomography because the method uses more information for the analysis. This method was proposed in the 1980s and has been actively researched in the latter half of 1990s. In recent years, the method has been put into practical use with efficient algorithms and improved computational capabilities.

Although this analysis method is capable of estimating high-resolution physical properties, the method tends to fall into a local optimal solution due to its non-linearity and high dependency to the initial model. An effective measure to this problem is to use data including low frequency component (2 Hz to 3 Hz) with a long offset distance (distance between the earthquake source and the vibration reception point). Furthermore, by using a highly accurate initial model using a highly accurate and highly reliable low frequency component, it is possible to prevent falling into a local optimum solution. Note that, it is common to perform analysis while shifting the frequency band from low frequency components to high frequency components, in order to perform a stable analysis. In addition, the analysis is performed further by adding information about succeeding waves. In summary, in the case of analysis using the full wave inversion, the reliability of the data in the low frequency region greatly contributes to the accuracy and reliability of the final underground analysis.

A high sensitive sensor is capable of catching a reflected wave reflected from a reflection surface at a deeper depth under the ground and thus is effective for analyzing an analysis target located at a deeper depth. In contrast, solving an inverse problem using a sensor with low sensitivity may result in falling into a local optimal solution. Therefore, in a case of analysis of a target located at a deeper depth, by preferentially using high-sensitivity sensors for the analysis in accordance with validity coefficients (reliability) representing the sensitivity of the sensors, more reliable underground image can be obtained. The scope of the target to be analyzed by data which has been limited or preferentially selected is specified by parameters. The values of the parameters may be varied on the basis of data obtained from other means, e.g., data produced in the past, core sample data of the past, or analysis data of the past or on the basis of the knowledge of a geologist and/or an authority having experience of exploration, in order to derive solution which is believed to be correct rather than a local optimal solution. In other words, a preferred output can be expected by preferentially applying sensor data for the calculation in a manner that depends on frequency sensitivity characteristics of sensor (e.g., noise spectral density) and the depth of the analysis target.

Figure 5:
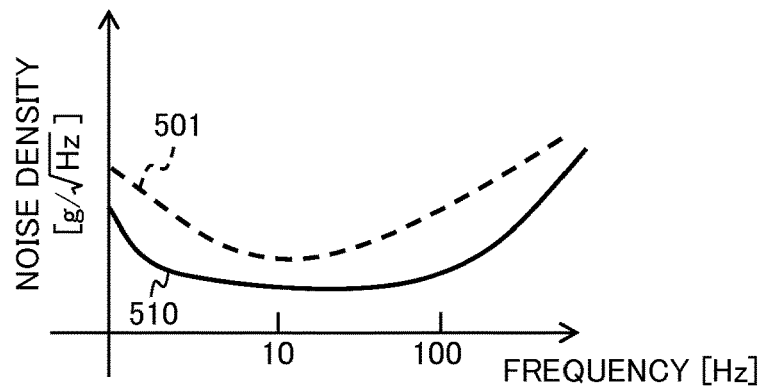
FIG. 5 is a diagram illustrating sensor characteristics expected of a geophone array and a MEMS sensor.
Figure 6:
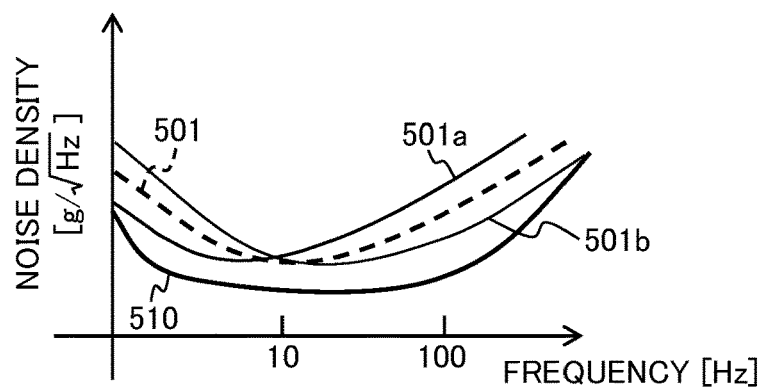
FIG. 6 is a diagram illustrating an example of improved sensor characteristics of the geophone array.
Figure 7:
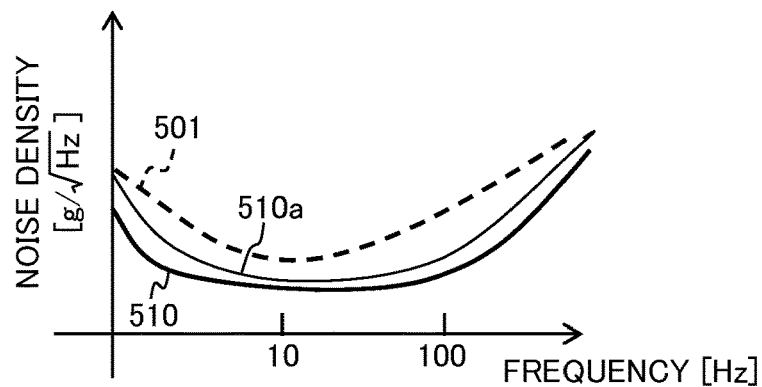
FIG. 7 is a diagram illustrating an example of an altered sensor characteristic of the MEMS sensor.

FIG. 5 is a diagram illustrating assumed sensor characteristics (noise spectral density) of the geophone array 301 and a MEMS sensor terminal 310. FIG. 6 is a diagram illustrating an example of a sensor characteristics (noise spectral density) of the geophone array 301, showing a case in which the sensor characteristics has been improved from that shown in FIG. 5. FIG. 7 is a diagram illustrating an example of a sensor characteristics (noise spectral density) of the MEMS sensor terminal 310, showing a case in which the sensor characteristics has altered from that shown in FIG. 5.

FIG. 5 is a diagram illustrating the sensor characteristics information (noise spectral density) of the MEMS sensor terminal 310 and the geophone array 301 constituted by the plurality of geophone sensor terminals 302. The sensor characteristic curve 510 of the MEMS sensor terminal 310 shows that the noise density thereof is low in a region from a low frequency region to a certain frequency in comparison with the sensor characteristic curve 501 of the geophone array 301.

The MEMS sensor terminal 310 is a device with a micron-level structure in which a sensor with mechanical elements, an actuator, and an electric circuit are gathered and is normally provided as a set in which an ASIC circuit is included. The MEMS sensor terminal 310 carries out measurement while applying a feedback to a sensor output. The ASIC circuit causes a noise in which 1/f noise of amplifier is dominant in a low frequency region and quantization noise of A/D converter is dominant in a high frequency region. As a result, the ASIC circuit has noise spectral density like the sensor characteristic curve 510 illustrated in FIG. 5.

FIG. 6 illustrates the sensor characteristic curve 501 of the geophone array 301, a sensor characteristic curve 501a of a geophone array constituted by low-frequency geophone sensors designed and implemented so as to obtain good sensitivity in a low frequency region, a sensor characteristic curve 501b of a geophone array constituted by low-frequency geophone sensors designed and implemented so as to obtain good sensitivity in a high frequency region, and the sensor characteristic curve 510 of the MEMS sensor terminal 310.

FIG. 7 illustrates the sensor characteristic curve 501 of the geophone array 301, and the sensor characteristic curve 510 of the MEMS sensor terminal 310 as well as a sensor characteristic curve 510a of a MEMS sensor whose sensitivity has degraded due to the use in fields and/or aged deterioration. The sensor characteristic curve 510a is drawn by plotting the values of the noise spectral density at measurement frequencies measured in a regular inspection of the sensor.

As shown in FIG. 5, in general, the noise density of the MEMS sensor terminal 310 is lower than that of the geophone array 301, particularly in a low frequency band. In addition, the noise density is lower than that of the geophone array 301 even in a high frequency band.

In contrast, as shown in FIG. 6, the geophone sensor terminal 302 (see FIG. 3) included in the geophone array 301 can be configured to have a specific frequency band in which its maximum sensitivity is obtained by setting the size of the coil and/or the magnet. However, it should be noted that as the frequency band is specified lower, the size gets bigger, resulting in the difficulty in implementation.

On the other hand, as shown in FIG. 7, the sensor characteristics information of the MEMS sensor terminal 310 shows alteration, due to degradation of the MEMS sensor terminal 310, from that of a new MEMS sensor. In this case, it is foreseen that the noise density will increase (the sensitivity will be degraded). For this reason, it is a matter of concern how to utilize a large number of sensor terminals with different noise spectral densities.

Figure 8:
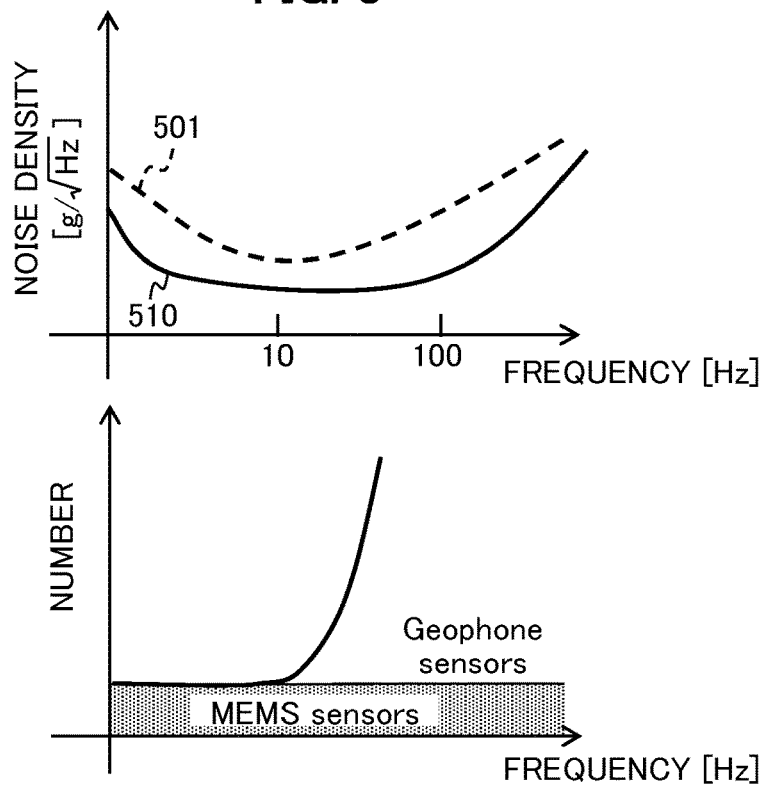
FIG. 8 is a diagram illustrating the frequency characteristics of the sensor terminals and an example of utilization of data used in calculation.
Figure 9:
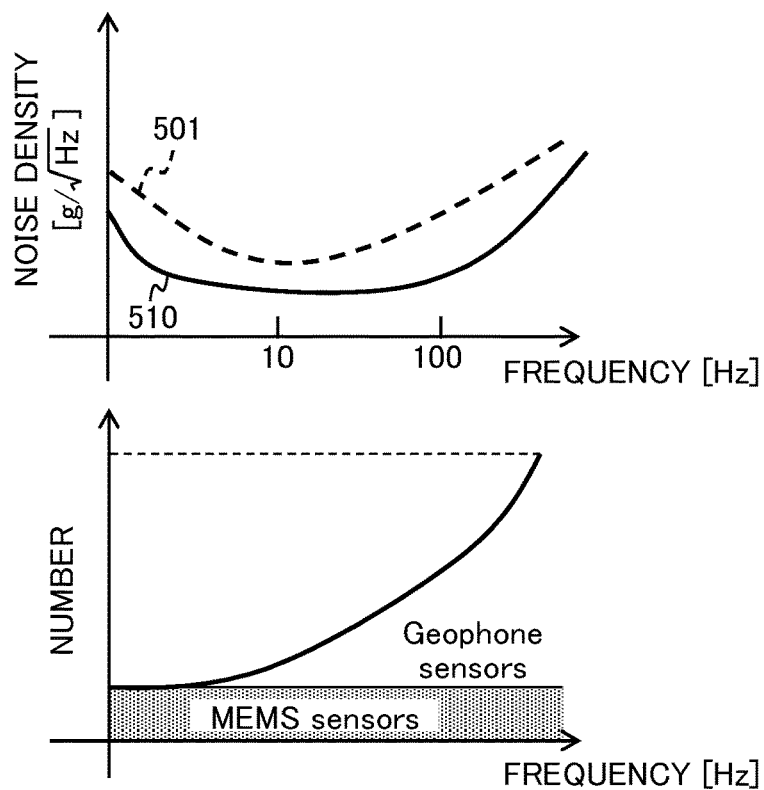
FIG. 9 is a diagram illustrating the frequency characteristics of the sensor terminals and an example of another utilization of data used in calculation.

FIG. 8 is a diagram illustrating the frequency characteristics of the sensor terminals and an example of utilization of data used in calculation. FIG. 9 is a diagram illustrating the frequency characteristics of the sensor terminals and an example of another utilization of data used in calculation. FIGS. 8 and 9 are diagrams presenting how the information obtained from the geophone array 301 and/or the MEMS sensor terminals 310 can be utilized using the information shown in FIG. 5.

FIG. 8 represents an embodiment that utilizes the sensors of both the geophone array 301 and the MEMS sensor terminals 310 in such a manner that only MEMS sensor terminals 310 having good sensitivity in a low frequency region are used in the low frequency region; and that the higher the frequency of the frequency component utilized in the calculation, the number of members in the geophone array 301 whose data is utilized for calculation is increased.

FIG. 9 represents an embodiment that utilizes the sensors of both the geophone array 301 and the MEMS sensor terminals 310 in such a manner that the number of members in the geophone array 301 whose data is utilized for calculation is gradually increased as the frequency used for the calculation is increased, rather than utilizing the data of geophone array 301 suddenly for frequencies higher than a certain frequency region.

According to the present embodiment, as shown in FIGS. 3 and 4, as the MEMS sensor terminals 310 are sparsely deployed in a distributed manner in the investigation area, the absolute number of the MEMS sensor terminals 310 is small. For this reason, the embodiment effectively uses the data of the geophone array 301 in the high frequency region. As discussed above, as the process of full wave inversion (FWI) gradually increases the analysis frequency from a low frequency band to estimate the underground structure, it is preferable that reliable information be input to the computer for the low frequency band processed at the beginning of the process. Therefore, by assigning validity coefficients (reliability) to data in accordance with the sensitivities at the calculation frequency bands, on the basis of the frequency characteristics of sensors, it is expected that the accuracy of estimating an underground structure be improved.

Figure 10:
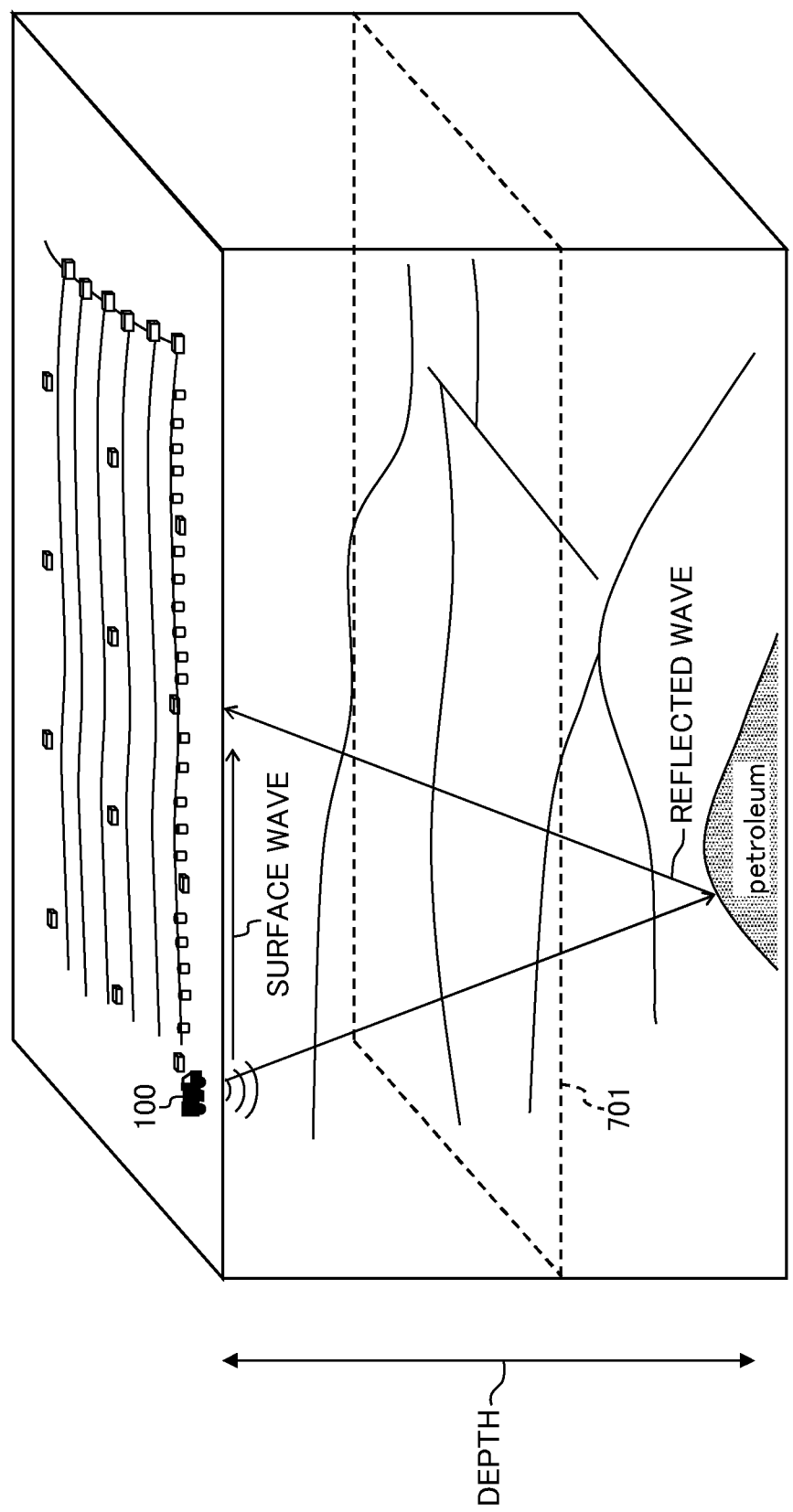
FIG. 10 is a diagram illustrating an example of resource exploration, in a three dimensional fashion.

FIG. 10 is a diagram illustrating an example of resource exploration, in a three dimensional fashion. Reference numeral 701 designates a reference plane located at the depth to be analyzed. An elastic wave generated from the vibrator vehicle 100 is attenuated as it is propagated to a deep stratum. Therefore, the depth that can be sensed by a sensor depends on the sensitivity of the sensor. Therefore, it is preferable to utilize high sensitive sensors and their data in exploration and analysis of deeper depth. However, when the target layer is a complex stratum, such as one that is multi-layered and not homogeneous or includes a fault, it acts as a factor that prevent signal propagation, and therefore the depth is not a sole parameter. Therefore, it is preferable to utilize data in accordance with the depth and the complexity of the stratum.

On the other hand, although there observed many cases in which the substantial complexity of the stratum can be estimated on the basis of data of the past or by another means, the depth is still a major parameter to be taken into account because the purpose of exploration is to clarify the stratum structure. In addition, these depend on the target area as well as the type of petroleum (conventional type; non-conventional type). In view of the foregoing, it is preferable to select data to be utilized in accordance with validity coefficients (reliability) on the basis of the sensitivity information of sensors and the depth and complexity and the like of the target to be analyzed. The above-described process may be executed by a computer program automatically or by an analysis person tuning the parameters on the basis of visualized data and other means.

Figure 11:
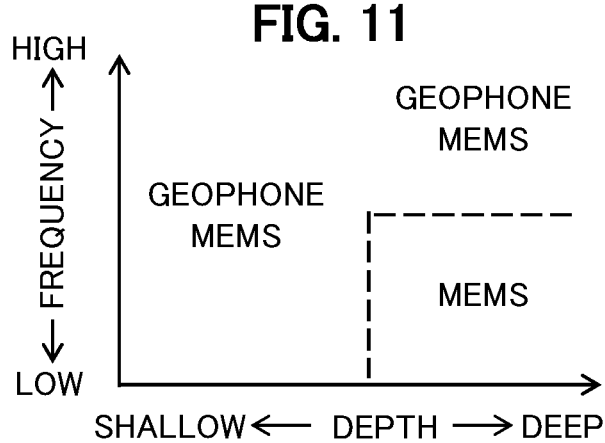
FIG. 11 is a diagram illustrating which sensors are to be used in resource exploration.

FIG. 11 is a diagram illustrating which sensors are to be used in resource exploration. The horizontal axis represents the depth; and the vertical axis represents the frequency. A description will be given a case in which geophone sensors and MEMS sensors are used as sensors. For a shallow depth, high sensitivity (low noise density) is not required. For a deep depth, however, high sensitivity is required. The MEMS sensors have higher sensitivity in the low frequency region than the geophone sensors. For this reason, using data from the MEMS sensor for a case of a deeper depth and a lower frequency region is more likely to perform the resource exploration with high accuracy.

An exploration system, which is an internal structure detection system of the present embodiment, includes: an artificial seismic source; a plurality of sensor terminals (e.g., sensor terminals 103) having different frequency characteristics; a computer (e.g., processing apparatus 120) performing an algorithm for analyzing the obtained data. Each of the plurality of sensor terminals includes a speed sensor or an acceleration sensor (e.g., geophone sensor terminal 302 and MEMS sensor terminal 310) which detects vibration generated by the artificial seismic source and which is assigned with a unique sensor ID. Each of the plurality of sensor terminals includes a storage device (e.g., storage unit 122) in which the frequency sensitivity information (sensor characteristics information) of the sensor terminal is stored; alternatively, the frequency sensitivity information of each of the plurality of sensor terminals is stored in a common storage device or is registered with a database, in association with the sensor identifier of the sensor terminal.

The sensors capture the elastic wave emitted from the artificial seismic source as a velocity or an acceleration, and record captured data in their storage devices. The computer renders an underground image with high accuracy by performing analysis using an algorithm that determines the underground structure in an explorative manner on the basis of the captured data and the sensor characteristics information.

The data to be inputted to the analysis is selected on the basis of indicators representing the sensor characteristics information and the analysis target, e.g., a depth. A plurality of sensors constituting a sensor group is deployed at positions determined on the basis of its noise spectral density to obtain highly accurate underground images.

By providing an optimal layout for the sensors used in the resource exploration according to the present embodiment in accordance with the noise spectral density of the sensors and assigning validity coefficients to data obtained by the sensors, an improvement is expected in the estimation of the underground structure. That is, by optimal deployment of the sensors used in the resource exploration and assignment of validity coefficients to the sensor characteristics information when performing an analysis using the deployed sensors, it is possible to obtain highly accurate underground images by the given sensor terminals and the data associated therewith.

The present embodiment has been described taking a resource exploration system as an internal structure detection system by way of example. However, the embodiment is not limited thereto. For example, the embodiment may be applied to a water leakage monitoring system or to a structural health monitoring system. The water leakage monitoring system is a system for detecting water leakage points of a water pipe or the like laid under a road. The water leakage monitoring system includes: two kinds of sensors with different operating principles for receiving reflected waves of vibration applied to an inspection target (water leakage point) in an investigation area; and a processing apparatus that detects the internal structure of the inspection target by using the sensor data received by the two kinds of sensors. The two kinds of sensors are deployed in the investigation area with different densities, in a distributed manner.

The structural health monitoring system is a system for diagnosing the structural performance of a construction on the basis of a response characteristics thereof against an earthquake and/or microtremor, using acceleration sensors or the like deployed on the construction. The structural health monitoring system includes: two kinds of sensors with different operating principles for receiving reflected waves of vibration applied to an inspection target in a construction; and processing apparatus that detects the internal structure of the inspection target by using the sensor data received by the two kinds of sensors. The two kinds of sensors are deployed in the investigation area with different densities, in a distributed manner.

REFERENCE SIGNS LIST

100 Vibrator Vehicle
101 group of vibrator vehicles
102 shot point
103 sensor terminal
104 movement path
105 satellite
106 observation vehicle
110 reservoir
120 processing apparatus
121 processing unit
122 storage unit
122A sensor inspection information
122B,122C,122D sensor characteristics information
201 MEMS acceleration sensor
202 acceleration signal processor
203 external I/F
204 processor
205 storage unit
206 GPS receiver
207 environmental sensor
208 battery
301 geophone array
302 geophone sensor terminal
303 analog-to-digital convertor (ADC)
310 MEMS sensor terminal 321 deployment interval of geophone array
322 deployment interval of MEMS sensor terminals
410 data logger (data collection device)
420 cable for data transmission and power supply
501,501a,501b,510,510a sensor characteristic curve
701 reference plane at depth of analysis target

The invention claimed is:

1. An internal structure detection system comprising:
two kinds of sensors with different operating principles for receiving reflected waves of vibration applied to an inspection target in an investigation area; and
a processing apparatus that detects an internal structure of the inspection target by using the sensor data received by the two kinds of sensors,
wherein the two kinds of sensors are deployed in the investigation area with different densities, in a distributed manner,
wherein the processing apparatus comprises a storage unit storing sensor information including noise spectral density for each sensor used for inspecting interior of the investigation area, the sensor information being associated with unique identification information of the sensor, and
wherein the sensor information is associated with validity coefficients representing which frequency bands of the sensor data obtained by the corresponding sensor are valid, the validity coefficients reflecting a result of inspecting the corresponding sensor at predetermined intervals.

2. The internal structure detection system according to claim 1,
wherein one of the two kinds of sensors is first sensors having a low noise density in a low frequency region,
wherein the other one of the two kinds of sensors is second sensors having a high noise density in a low frequency region, and
wherein the first sensors are deployed in the investigation area in such a manner that the first sensors are distributed more sparsely than the second sensors.

3. The internal structure detection system according to claim 2,
wherein the first sensors having the low noise density in the low frequency region are MEMS sensors and the second sensors having the high noise density in the low frequency region are geophone sensors.

4. The internal structure detection system according to claim 3,
wherein measurement frequency bands of the two kinds of sensors are at least overlapped.

5. The internal structure detection system according to claim 2,
wherein measurement frequency bands of the two kinds of sensors are at least overlapped.

6. The internal structure detection system according to claim 1,
wherein the two kinds of sensors are geophone sensors and MEMS sensors.

7. The internal structure detection system according to claim 6,
wherein measurement frequency bands of the two kinds of sensors are at least overlapped.

8. The internal structure detection system according to claim 1,
the processing apparatus selects data from the sensor data of the two kinds of sensors used for detecting the internal structure in a manner that depends on a distance from a surface of the inspection target to which vibration is applied to where the reflected wave resulting from the vibration has been reflected.

9. The internal structure detection system according to claim 8,
wherein measurement frequency bands of the two kinds of sensors are at least overlapped.

10. The internal structure detection system according to claim 1,
wherein measurement frequency bands of the two kinds of sensors are at least overlapped.

11. The internal structure detection system according to claim 1,
wherein a value of "1" for a validity coefficient at a particular frequency means that data at that frequency is to be used and a value of "0" for the validity coefficient at the particular frequency means that the data at that frequency is not to be used.

* * * * *